US008722750B2

(12) United States Patent
Van Rheenen et al.

(10) Patent No.: US 8,722,750 B2
(45) Date of Patent: May 13, 2014

(54) POLYMER COMPOSITION

(75) Inventors: Paul Van Rheenen, Warminster, PA (US); Eric G. Lundquist, North Wales, PA (US); Brian H. Clare, Portland, OR (US); Ling Li, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 667 days.

(21) Appl. No.: 12/283,934

(22) Filed: Sep. 17, 2008

(65) Prior Publication Data

US 2009/0093560 A1 Apr. 9, 2009

Related U.S. Application Data

(60) Provisional application No. 60/997,880, filed on Oct. 5, 2007.

(51) Int. Cl.
| | |
|---|---|
| *C08J 9/00* | (2006.01) |
| *C08L 27/14* | (2006.01) |
| *C08L 23/28* | (2006.01) |
| *C08L 27/06* | (2006.01) |
| *C08L 33/12* | (2006.01) |

(52) U.S. Cl.
CPC ............. *C08L 23/286* (2013.01); *C08L 27/06* (2013.01); *C08L 33/12* (2013.01); *C08J 9/00* (2013.01); *C08J 2327/02* (2013.01)
USPC ............. 521/95; 521/134; 521/145; 525/222; 525/223; 525/231; 525/239

(58) Field of Classification Search
USPC ............. 521/95, 134, 145; 525/222, 223, 231, 525/239
See application file for complete search history.

(56) References Cited

U.S. PATENT DOCUMENTS

| | | | |
|---|---|---|---|
| 2,646,417 A | 7/1953 | Jennings | |
| 3,261,785 A | 7/1966 | Robinson | |
| 3,975,315 A | 8/1976 | Parks | |
| 4,808,649 A | 2/1989 | Gay et al. | |
| 4,956,222 A | 9/1990 | Matsuura et al. | |
| 5,206,296 A | 4/1993 | Dominique et al. | |
| 6,670,419 B2 * | 12/2003 | Lau et al. ................. | 525/64 |
| 6,765,033 B1 | 7/2004 | Sunagawa et al. | |
| 6,852,800 B2 | 2/2005 | Cruz et al. | |
| 2003/0027881 A1 | 2/2003 | Sunagawa et al. | |

FOREIGN PATENT DOCUMENTS

| | | |
|---|---|---|
| EP | 1 245 643 A | 10/2001 |
| EP | 1153936 | 11/2001 |
| EP | 1 637 561 A | 3/2006 |
| EP | 1 798 258 A | 6/2007 |

OTHER PUBLICATIONS

Klempner. D., Sendijarevic, V., Handbook of Polymeric Foams . . . 2nd Edition, Chapter 9, Hanser Publisher Munich 2004.
Haworth, B., et al.,,Elongational deformation . . . Plastics, Rubber and Composites..v 22(1994) 159-169, The Institute of England, Great Britain.
Yanez-Flores, I. G., et al, Peroxide crossliking of PVC foam . . . , European Polymer Journal 36 (2000) 2235-2241.
Gachter, R., Muller, H., Klemchuk, P.P., Stablizers, Processing Aids, Plasticizers . . . Plastics Additives Handbook, 4th Edition, Hanser Publishers, Munich.
Rudin, A., Basic Principles of Polymer . . . The Elements ofPolymer Science p. 41-48, Academic Press 1982.

* cited by examiner

*Primary Examiner* — Irina S Zemel

(57) ABSTRACT

A halogenated polymer containing a functionalized polymer and optionally a blowing agent.

8 Claims, No Drawings

POLYMER COMPOSITION

This invention claims priority to U.S. Provisional Application No. 60/997,880 filed Oct. 5, 2007.

This invention relates to halogenated polymer compositions that are useful, among other things, as wood replacements.

Halogenated polymers such as polyvinyl chloride ("PVC") are employed as building materials to replace wood in a variety of applications such as house fascia, trim, and decorative molding mill work. By "halogenated polymers" we mean (1) homopolymers or copolymers containing greater than 80% of vinyl chloride, vinyl fluoride, vinylidene chloride, and vinylidene fluoride, and (2) chlorinated polyvinyl chloride, and chlorinated polyethylene. The most common of these polymers industrially is PVC so our general description will emphasize PVC and foamed PVC as examples. PVC foam is also used for signage, deck boards, and in the cores of some types of PVC pipe.

Foamed PVC for these various applications is typically made in a continuous extrusion process. The most common extrusion practices involve free foaming out of the die followed by some type of calibration and the Celuka or intregrated skin process. A description of these PVC foaming processes and typical formulation ingredients can be found in the Handbook of Polymeric Foams and Foam Technology, Ed. Klemper, D., Sendijarevic, V., $2^{nd}$ edition, Hanser Publishers, Munich, 2004 chapter 9.

Key components of foamed PVC formulations are PVC, thermal stabilizer, lubricants, one or more blowing agents, and (co)polymers additives such as impact modifiers and processing aid polymers. The processing aid polymers are materials that are compatible with PVC and tend to be copolymers that are high in methyl methacrylate or other compositions that are compatible with PVC, for example, styrene acrylonitrile copolymers. U.S. Pat. Nos. 2,646,417, 3,975,315, 5,206,296, and 6,765,033 and EP1,153,936 describe the types of polymer compositions used as processing aids for PVC. By "compatible" we mean that the processing aid polymer mixes or disperses uniformly into the PVC during thermal processing. The mixture need not be optically clear, but a single glass transition temperature, Tg, for the two blended polymers is generally preferred. At the very least if two separate Tg's are seen for the blended polymers, they are shifted by the presence of the other polymer.

These processing aid polymers increase melt extensibility and strength due to their high MW and compatibility with PVC. This in turn helps prevent uncontrolled expansion of the foam cells during foaming to give a small cell size. Also, high melt strength helps prevent foam collapse while the extruded foam sheet is cooling and helps lock in the foam structure. High melt strength, in addition, allows the pulling of hot extruded material through sizing or calibrating equipment. Any scrap or trim material can be ground up and reused in the extrusion process in that the foamed material is a thermoplastic and not a cross linked thermoset material. Being able to recycle the material as regrind is important for economics and waste handling.

It is not unusual for these processing aids to have weight average molecular weights in the 0.5 to 15 million range with the higher MW materials showing greater efficiency (Haworth, B., Chua L., Thomas, N L., Plastics, Rubber and Composites Processing and Applications, (1994), 22, p. 159). Use levels can fall in the range of 0.5 to 20 parts per hundred on PVC in the formulation depending on the processing aid MW, the desired density, and sheet thickness. Lower density and higher sheet thickness require higher processing aid use levels.

An alternative to the use of high MW processing aids to allow foaming is to use a cross linking agent for the matrix polymer. The cross linking agent must cure at a temperature and rate similar to the decomposition of the chemical blowing agents to set the foam. This approach is used in industry to make polyurethane, epoxy foams, and the like (Handbook of Polymeric Foams and Foam Technology, Ed. Klemper, D., Sendijarevic, V., $2^{nd}$ edition, Hanser Publishers, Munich, 2004).

This curing approach has also been used for halogenated polymers like PVC. In a typical approach, PVC, blowing agent, and cross linking agent are combined together and placed in a mold under pressure. The mold is heated to the temperature that causes the blowing agent to generate gas and the pressure is released causing foaming and curing to occur in the same time frame. In this way, the foam structure is locked in and a thermoset material is generated that has high heat resistance and resistance to compression set, but scrap from the foam can not easily be reprocessed. Also, this type of approach does not lend itself to extrusion type foaming processes as curing tends to occur inside the extruder.

Examples for this type of approach include U.S. Pat. No. 3,261,785 where a non-polymeric poly functional sulfonazide is used as a cross linker for PVC. In U.S. Pat. No. 4,956,222, an isocyanate curing agent is used with plasticized PVC where the PVC contains active hydrogen functionality, or an acrylic polymer with active hydrogen functionality is blended with the PVC and cured with an isocyanate. In European Polymer Journal 36 (2000) p. 2235, cross linking of PVC foam through the use of peroxides and trimethacrylate monomers is described. These approaches have the limitations that scrap can not be reprocessed. Also, this type of approach does not lend itself to extrusion type foaming processes as controlling the curing rate so that the material does not cure in the extruder and cause melt viscosity issues is difficult.

Industry wants to be able to increase sheet thickness of PVC foam board beyond that which can be obtained with current, high molecular weight processing aids. Also industry desires to reduce foam density. Low gloss is also desired to give the appearance of wood rather than shiny plastic. (Co) polymer additives that reduce foam collapse could be enabling technology towards these goals and would give improved foam board in general by improving foam cell structure. At the same time it is important that scrap can be reused in extrusion, melt processing type manufacturing.

We have found that high molecular weight processing aid polymers that contain functionality described below that strongly interacts with halogenated polymers like PVC reduces the amount of collapse in foamed polymers as compared to processing aid analogs made without this functionality. This is evidenced by reduced density and higher sheet thickness in the polymeric foam as compared to formulations containing analog polymers without the functionality. We have also found that these processing aid polymers reduce the gloss of both foamed and nonfoamed PVC articles.

This invention is a formulation comprising
(a) from 50 to 99% by weight of one or more halogenated polymers (A) selected from homopolymers or copolymers comprising at least 80% by weight of the halogenated polymer of one or more monomers selected from vinyl chloride, vinyl fluoride, vinylidene chloride, and vinylidene fluoride; and chlorinated polyvinyl chloride, and chlorinated polyethylene;

(b) from 0.5 to 20% by weight of one or more (co)polymer (B) with a weight average molecular weight greater than 0.5 million which polymer (B) comprises 0.4 to 100 mole % (preferably 0.8 to 40 mole %, more preferably 0.8 to 5 mole %) based on monomer repeat units of one or more functionalities selected from β-keto esters, β-keto amides, β-diketones, cyanoacetic esters, malonates, nitroalkanes, β-nitro esters, sulfonazides, thiols, thiol-s-triazines, and amine where the functionality is incorporated into polymers by polymerizing, ethylenically unsaturated monomers containing these functionalities or by post functionalization of a polymer with additional reactions after polymerization.

By "(co) polymer," we mean a homopolymer or copolymer.

Preferably the substituted ethylenically unstaturated monomer is selected from the group of β-keto esters and amides, β-diketones, cyanoacetic esters, malonates, nitroalkanes and β-nitro esters:

Preferably, the substituted ethylenically unstaturated monomer is selected from the group of acetoacetoxyethyl (meth)acrylate, acetoacetoxypropyl(meth)acrylate, acetoacetoxybutyl(meth)acrylate, 2,3-di(acetoacetoxy) propyl (meth)acrylate, acetoacetoxyethyl(meth)acrylamide, 2-cyanoacetoxyethyl(meth)acrylate, 2-cyanoacetoxyethyl (meth)acrylamide, N-cyanoacetyl-N-methylaminoethyl (meth)acrylate, N-(2 propionylacetoxybutyl)(meth)acrylamide.

Most preferably, the substituted ethylenically unstaturated monomer is acetoacetoxyethyl(meth)acrylate.

The formulation of this invention optionally further comprises 0.1 to 6% by weight of a blowing agent.

In one embodiment, the Tg of (co)polymer (B) is between 0° C. and 150° C., preferably between 55° C. to 150° C.

This invention also is an extruded formulation as described above preferably comprising less than 10% gel content.

We believe the strongly interacting functional groups in the processing aid polymer react with the PVC during extrusion processing to provide light cross linking of the PVC. In this way a loose network is formed between polymer molecules, but the material is still re-processible in that no substantial amount of insoluble gel is formed when the material is extruded. In this way, we combine the features of high MW processing aids and the features of a cross linked system by putting the cross linking functionality into the processing aid polymer and limiting the cross linking by the level and type of functionality as described below.

These functional groups can be incorporated into processing aid polymers by the copolymerization of ethylenically unsaturated monomers that contain these functionalities with other ethenically unsaturated monomers used to make such processing aid polymers. Polymerization can be by solution, suspension, emulsion, or bulk polymerization. Such functionalities are activated methylene or methyne groups that can be involved in Michael addition reactions Such functional groups include β-keto esters and amides, β-diketones, cyanoacetic esters, malonates, nitroalkanes and β-nitro esters.

Alternately, the functional groups can be incorporated into the (co)polymer (B) by making the polymer and then post functionalizing it with subsequent reactions. For example, a β-keto esters functional containing polymer can be produced by post functionalizing a hydroxyl containing polymer with diketene.

General examples of monomers containing such functional groups are allyl acetoacetate, vinyl acetoacetate. Examples of acrylate monomers that contain such functional groups (where (meth) refers to acrylates as well as methacrylates) are (meth)acrylic acid acetoacetoxyalkyl esters and amides. Specific examples include acetoacetoxyethyl(meth)acrylate ("AAEM"), acetoacetoxypropyl(meth)acrylate, acetoacetoxybutyl(meth)acrylate, 2,3-di(acetoacetoxy) propyl (meth)acrylate, acetoacetoxyethyl(meth)acrylamide, 2-cyanoacetoxyethyl(meth)acrylate, 2-cyanoacetoxyethyl(meth) acrylamide, N-cyanoacetyl-N-methylaminoethyl(meth) acrylate, N-(2 propionylacetoxybutyl) (meth)acrylamide, and the like.

Another useful additional functional group that can be incorporated into monomers for polymerization is sulfonazide, (a.k.a. sulphonazide). Examples of how to make these sulfonazide-containing monomers are given in GB 1,138,929. Vinyl, vinylidene, and styryl compounds containing the sulphonazide groups are such suitable monomers. Particularly interesting examples of such monomers in GB 1138929 are m and p-methacryloylaminophenyl sulphonazide, m and p-acryloylaminophenyl sulphonazide, and reaction products of 1 mole of 3- or 4-sulphonazidophenyl isocyanate with 1 mole of vinyl or vinylidene monomers containing hydroxyl groups, for example with hydroxypropyl(meth)acrylate or hydroxyethyl(meth)acrylate.

Other reactive functionality to incorporate into (co)polymers (B) by the appropriate monomers or post functionalization of a polymer after polymerization are thiol, thiol-s-triazines, and amino functionality.

These functional monomers are used at levels of 0.4 to 100 mole % in the (co)polymers (B), with 0.8 to 5 mole % being preferred when processing aid levels of 11 parts per hundred (PHR) are used in the formulation. When the processing aid is used at a concentration of 11 PHR in the foam formulation, at levels around 9 mole %, the PVC becomes cured to the point that it can not be reprocessed as regrind, and the foamed polymer contains a high level of insoluble gel (see table 3).

To make reprocessable formulations with processing aid (co)polymer (B) having greater than 9 mole % of such functionalites described above, lower total amount of processing aid is required. For example, based on using 11 PHR of a polymer containing 2.37 mole % of AAEM like example 4, one needs 0.869 PHR of a processing aid containing 30 mole percent of AAEM ((11×2.37)/30=0.869 PHR). In order to maintain similar melt viscosity, a nonfunctional processing aid like example 1 should be added to the formulation containing 0.869 PHR of the 30 mole % functional processing aid to keep the total level of processing aid around 11 PHR. Similar examples can be worked out for various mole % of functional processing aid up to 100 mole % functionality.

These processing aid polymers are materials with a weight average molecular weight greater than 0.5 million, with 1 to 10 million being preferred. The definition of weight average molecular weight is found in The Elements of Polymer Science and Engineering, Alfred Rudin, Academic Press, 1982, p. 42. The method of molecular weight measurement is given in the experimental test method section below.

The processing aid polymers (B) preferably have a Tg greater than 0° C. and below 150° C. An even more desired range is 55° C. to 150° C. as this makes it easier to isolate the polymer as powder or pellets. "Tg" is the "glass transition temperature" of a polymeric phase. The glass transition temperature of a polymer is the temperature at which a polymer transitions from a rigid, glassy state at temperatures below its Tg to a fluid or rubbery state at temperatures above Tg. The Tg of a polymer is measured by differential scanning calorimetry (DSC) using the mid-point in the heat flow versus temperature transition as the Tg value. For the purposes of this measurement, a heating rate for the DSC measurement is 20 Centigrade degrees per minute.

When made by emulsion polymerization, the processing aid polymers can be made as single stage, uniform composition material, or as one of the stages in a multistage material similar to the manner described in U.S. Pat. No. 3,833,686 or as blends of two more processing aids that differ in Tg and, or composition. The multistage and blend approach is particularly useful when the Tg of one of the components or stages is less than 55° C. By putting on a final stage with a Tg greater than 55° C. or blending in a second polymer with a Tg greater than 55° C., polymers made by emulsion or suspension polymerization are more readily isolated by drying into powders or pellets that are free flowing.

The processing aid polymers (B) need to be compatible with the base halogenated polymer that is being foamed. By "compatible" we mean that the processing aid polymer mixes or disperses uniformly into the base polymer during thermal processing. The mixture may not be optically clear, but a single glass transition temperature, Tg, for the two blended polymers is generally seen. At the very least, if two separate Tg's are seen for the blended polymers, they are shifted by the presence of the other polymer.

Processing aid polymers (B) containing the functional groups, that have a Tg greater than 0° C., and that are compatible with the polymer being foamed can be polymerized from ethylenically unsaturated monomers known to the art.

Suitable for use as co-monomers (with the functionalized monomers described above) in the processing aid polymers (B) are monoethylenically unsaturated monomers such as alkyl acrylates in which the alkyl group contains no more than eighteen carbon atoms, preferably no more than eight carbon atoms; alkyl methacrylates in which the alkyl portion contains no more than eighteen carbon atoms, preferably no more than eight carbon atoms; acrylonitrile; methacrylonitrile; acrylic acid; methacrylic acid; styrene; and substituted styrenes particularly alkyl substituted styrenes wherein the alkyl group contains no more than fourteen carbon atoms, and other vinyl monomers like vinyl chloride, ethylene, vinyl acetate and vinyl versitate. Typical of the suitable co-monomers are ethyl acrylate, butyl acrylate, 2-ethylhexyl acrylate, methyl methacrylate, butyl methacrylate, tert-butyl methacrylate, cyclohexyl methacrylate, hydroxyethylmethacrylate, acrylonitrile, methacrylonitrile, acrylic acid, methacrylic acid, styrene, o-chlorostyrene and α-methyl styrene. Styrene and methyl methacrylate are the preferred monomers. Likewise the functionality can be polymerized into a copolymer of polyethylene that is then chlorinated to make the processing aid polymer compatible with PVC or other halogenated polymers.

The processing aid polymers are typically isolated to form a free-flowing powder or pellets, the powder particles having a 50-500 micron mean diameter. This processing aid polymer is subsequently added to thermoplastic foam formulations.

A key component in making foamed plastics is the blowing agent. Chemical blowing agent can be any of a variety of chemical blowing agents which release a gas upon thermal decomposition. The blowing agent or mixtures of agents can be selected from chemicals containing decomposable groups such as azo, N-nitroso, carboxylate, carbonate, heterocyclic nitrogen-containing and sulfonyl hydrazide groups. Generally, they are solid materials that liberate gas(es) when heated by means of a chemical reaction or upon decomposition. Representative compounds include azodicarbonamide and derivatives, bicarbonates, hydrazine derivatives, semicarbazides, tetrazoles, benzoxazines, and borohydrates as outlined in Plastic Additives Handbook, eds. R. Gachter, H. Muller, and P. P. Klemchuk, Hanser Gardner Publishers, Cincinnati, 1996, Chp. 16. Examples of these blowing agents are azodicarbonamide, 4,4-oxybis(benzenesulfohydrazide), diphenylsulfone-3,3-disulfohydrazide, trihydrazinotriazine, p-toluoylenesulfonyl semicarbazide, 5-phenyltetrazole, isatoic anhydride, sodium bicarbonate, and sodium borohydride. In addition to chemical blowing agents, physical blowing agents such as gases and volatile liquids can also be used. Foaming can be generated by super critical gases like $CO_2$ that are injected into the extruder.

The blowing agent may be added to the polymer in several different ways which are known to those skilled in the art, for example, by adding the solid powder, liquid or gaseous agents directly to the resin in the extruder while the resin is in the molten state to obtain uniform dispersal of the agent in the molten plastic. Preferably the blowing agent is added before the extrusion process and is in the form of a solid. The temperature and pressures to which the foamable composition of the invention are subjected to provide a foamed composition will vary within a wide range, depending upon the amount and type of foaming agent that is used.

In addition to the matrix halogenated polymer (A), functional polymer processing aid and blowing agent, formulations can include thermal stabilizers, light stabilizers, antioxidants, impact modifiers, lubricants, waxes, plasticizers, fillers, fibers, pigments, conventional or nonfunctional processing aid polymers, and other common additives.

Molecular weight measurements by size exclusion chromatography (SEC) were performed as follows. Sample was prepared in ethyl acetoacetate at concentration of about 0.5 mg/mL. The samples were shaken on shaker at least overnight at room temperature. They were kept for 7 days at room temperature, followed by 30 minutes at 160° C., and cooled to room temperature before testing. Sample solutions were filtered using 1 μm PTFE filter before SEC analysis.

Separations were carried out at room temperature on a liquid chromatograph consisting of a PerkinElmer 200 series pump and autosampler and Waters 410 model refractive index (RI) detector (Milford, Mass.). Detector was operated at following conditions: Sensitivity 128, Scale factor 20, Temperature=40° C. System control, data acquisition, and data processing were performed using 3.0 version of Cirrus® software (Polymer Laboratories, Church Stretton, UK).

SEC separations were performed in ethyl acetoacetate at a flow rate of 0.5 mL/min using one Shodex KF804 column (300×7.5 mm ID) packed with polystyrene-divinylbenzene gel purchased from Shoko America, Inc (La Jolla, Calif., USA). 100 μL of sample solution with concentration of about 0.5 mg/mL was subjected for SEC separation. Weight average and number average molecular weight were recorded for each example.

Calibration: Polymethylmethyacrylate (PMMA) standards having $M_p$ in the range 1960 to 1,944,000 g/mol with concentration of about 0.5 mg/mL in ethyl acetoacetate were used to construct 9 point calibration curve ($3^{rd}$ order) which was used to evaluate the relative M of analyzed sample.

We made certain examples reported below of this invention as well as a comparative. In the examples that follow, the abbreviations below were used:

MMA=methyl methacrylate
BA=butyl acrylate
BMA=butyl methacrylate
AAEM=acetoacetoxyethyl methacrylate

EXAMPLE 1

Comparative Example with 0 wt % AAEM (0 mole %)

A 5 L round bottom flask was fitted with a stirrer, temperature controller, nitrogen line and condenser. 2250 g of deionized water and 0.59 grams of glacial acetic acid were charged into the flask. The mixture was warmed to 33° C., with stirring at 200 rpm and a nitrogen sparge. The sparge was switched to a nitrogen sweep, and then 45.72 g of Dowfax 2A1 (51%) was charged to the flask with a 20.25 gram water rinse. A monomer mix of 1069.74 g MMA, 50.94 g BMA and 152.82 g BA was prepared, then added to the reaction flask over 1 minute, followed by a 90.0 g water rinse. Next, a solution of 0.01 g $FeSO_4$, 0.08 g EDTA and 6.16 g water was then added to the reactor. Then, 5.01 g of t-butylhydroperoxide (5%) was added with 13.50 g water rinse, followed by addition of 0.22 g sodium formaldehyde sulfoxylate dissolved in 13.50 g of water. The reaction temperature was observed to increase to 83 C over the course of 90 minutes. The reaction was held at the peak temperature for 10 minutes. Next, 1.67 g of t-butylhydroperoxide (5%) was added with a 4.50 g water rinse, 0.07 g of sodium formaldehyde sulfoxylate dissolved in 4.50 g of water was added. The resultant latex was then cooled slowly to <40 C and filtered through a mesh cloth (34.4% solids).

EXAMPLE 2

AAEM=1.0 wt % (0.46 mole %)

A 1 L round bottom flask was fitted with a stirrer, temperature controller, nitrogen line and condenser. 500 g of deionized water and 0.131 g of glacial acetic acid were charged into the flask. The mixture was warmed to 32 C, with stirring at 255 rpm and a nitrogen sparge. The sparge was switched to a nitrogen sweep, and then 10.159 g of Dowfax 2A1 (51%) was charged to the flask with a 4.5 g water rinse. A monomer mix of 235.37 g MMA, 11.21 g BMA, 33.62 g BA and 2.8 g AAEM was prepared, then added to the reaction flask over 1 minute followed by a 20.0 g water rinse. Next, a solution of 0.002 g $FeSO_4$, 0.017 g EDTA and 1.368 g water was then added to the reactor. Then, 1.113 g of t-butylhydroperoxide (5%) was added with 3.00 g water rinse, followed by addition of 0.048 g sodium formaldehyde sulfoxylate dissolved in 3.00 g of water. The reaction temperature was observed to increase to 78 C over the course of 105 minutes. The reaction was held at the peak temperature for 10 minutes. Next, 0.371 g of t-butylhydroperoxide (5%) was added with a 1.00 g water rinse, 0.016 g of sodium formaldehyde sulfoxylate dissolved in 1.00 g of water was added. The resultant latex was then cooled slowly to <40 C and filtered through a mesh cloth (34.4% solids).

EXAMPLE 3

AAEM=2.0 wt % (0.96 mole %)

A 1 L round bottom flask was fitted with a stirrer, temperature controller, nitrogen line and condenser. 500 g of deionized water and 0.131 g of glacial acetic acid were charged into the flask. The mixture was warmed to 31 C, with stirring at 255 rpm and a nitrogen sparge. The sparge was switched to a nitrogen sweep, and then 10.159 g of Dowfax 2A1 (51%) was charged to the flask with a 4.5 g water rinse. A monomer mix of 237.72 g MMA, 11.32 g BMA, 33.96 g BA and 5.66 g AAEM was prepared, then added to the reaction flask over 1 minute followed by a 20.0 g water rinse. Next, a solution of 0.002 g $FeSO_4$, 0.017 g EDTA and 1.368 g water was then added to the reactor. Then, 1.113 g of t-butylhydroperoxide (5%) was added with 3.00 g water rinse, followed by addition of 0.048 g sodium formaldehyde sulfoxylate dissolved in 3.00 g of water. The reaction temperature was observed to increase to 78 C over the course of 90 minutes. The reaction was held at the peak temperature for 20 minutes. Next, 0.371 g of t-butylhydroperoxide (5%) was added with a 1.00 g water rinse, 0.016 g of sodium formaldehyde sulfoxylate dissolved in 1.00 g of water was added. The resultant latex was then cooled slowly to <40 C and filtered through a mesh cloth (34.2% solids).

EXAMPLE 4

AAEM=4.8 wt % (2.37 mole %)

A 1 L round bottom flask was fitted with a stirrer, temperature controller, nitrogen line and condenser. 500 g of deionized water and 0.131 g of glacial acetic acid were charged into the flask. The mixture was warmed to 31 C, with stirring at 255 rpm and a nitrogen sparge. The sparge was switched to a nitrogen sweep, and then 10.159 g of Dowfax 2A1 (51%) was charged to the flask with a 4.5 g water rinse. A monomer mix of 237.72 g MMA, 11.32 g BMA, 33.96 g BA and 14.15 g AAEM was prepared, then added to the reaction flask over 1 minute followed by a 20.0 g water rinse. Next, a solution of 0.002 g $FeSO_4$, 0.017 g EDTA and 1.368 g water was then added to the reactor. Then, 1.113 g of t-butylhydroperoxide (5%) was added with 3.00 g water rinse, followed by addition of 0.048 g sodium formaldehyde sulfoxylate dissolved in 3.00 g of water. The reaction temperature was observed to increase to 78 C over the course of 105 minutes. The reaction was held at the peak temperature for 10 minutes. Next, 0.371 g of t-butylhydroperoxide (5%) was added with a 1.00 g water rinse, 0.016 g of sodium formaldehyde sulfoxylate dissolved in 1.00 g of water was added. The resultant latex was then cooled slowly to <40 C and filtered through a mesh cloth (33.2% solids).

EXAMPLE 5

AAEM=9.1 wt % (4.63 mole %)

A 1 L round bottom flask was fitted with a stirrer, temperature controller, nitrogen line and condenser. 500 g of deionized water and 0.131 g of glacial acetic acid were charged into the flask. The mixture was warmed to 32 C, with stirring at 255 rpm and a nitrogen sparge. The sparge was switched to a nitrogen sweep, and then 10.159 g of Dowfax 2A1 (51%) was charged to the flask with a 4.5 g water rinse. A monomer mix of 216.11 g MMA, 10.29 g BMA, 30.87 g BA and 25.73 g AAEM was prepared, then added to the reaction flask over 1 minute followed by a 20.0 g water rinse. Next, a solution of 0.002 g $FeSO_4$, 0.017 g EDTA and 1.368 g H2O was then added to the reactor. Then, 1.113 g of t-butylhydroperoxide (5%) was added with 3.00 g water rinse, followed by addition of 0.048 g sodium formaldehyde sulfoxylate dissolved in 3.00 g of water. The reaction temperature was observed to increase to 78 C over the course of 100 minutes. The reaction was held at the peak temperature for 10 minutes. Next, 0.371 g of t-butylhydroperoxide (5%) was added with a 1.00 g water rinse, 0.016 g of sodium formaldehyde sulfoxylate dissolved in 1.00 g of water was added. The resultant latex was then cooled slowly to <40 C and filtered through a mesh cloth (33.4% solids).

EXAMPLE 6

AAEM 4.8 wt % Low MW system (2.37 mole %)

A 5 L round bottom flask was fitted with a stirrer, temperature controller, nitrogen line and condenser. 2250 g of deionized water and 0.59 g of glacial acetic acid were charged into the flask. The mixture was warmed to 33 C, with stirring at 200 rpm and a nitrogen sparge. The sparge was switched to a nitrogen sweep, and then 45.72 g of Dowfax 2A1 (51%) was charged to the flask with a 20.25 g water rinse. A monomer mix of 1069.74 g MMA, 50.94 g BMA, 152.82 g BA, 63.68 g AAEM and 0.310 g of BMP was prepared, then added to the reaction flask over 1 minute followed by a 90.0 g water rinse. Next, a solution of 0.01 g FeSO4, 0.08 g EDTA and 6.16 g water was then added to the reactor. Then, 5.01 g of t-butylhydroperoxide (5%) was added with 13.50 g water rinse, followed by addition of 0.22 g sodium formaldehyde sulfoxylate in 13.50 g of water. The reaction temperature was observed to increase to 83 C over the course of 120 minutes. The reaction was held at the peak temperature for 10 minutes. Next, 1.67 g of t-butylhydroperoxide (5%) was added with a 4.50 g water rinse, 0.07 g of sodium formaldehyde sulfoxylate dissolved in 4.50 g of water was added. The resultant latex was then cooled slowly to <40 C and filtered through a mesh cloth (34.8% solids).

EXAMPLE 7

AAEM=16.6 wt % (8.81 mole %)

A 5 L round bottom flask was fitted with a stirrer, temperature controller, nitrogen line and condenser. 2250 g of deionized water and 0.59 g of glacial acetic acid were charged into the flask. The mixture was warmed to 33 C, with stirring at 200 rpm and a nitrogen sparge. The sparge was switched to a nitrogen sweep, and then 45.72 g of Dowfax 2A1 (51%) was charged to the flask with a 20.25 g water rinse. A monomer mix of 891.45 g MMA, 51.00 g BMA, 127.35 g BA, and 212.25 g AAEM was prepared, then added to the reaction flask over 1 minute followed by a 90.0 g water rinse. Next, a solution of 0.01 g FeSO4, 0.08 g EDTA and 6.16 g water was then added to the reactor. Then, 5.01 g of t-butylhydroperoxide (5%) was added with 13.50 g water rinse, followed by addition of 0.22 g sodium formaldehyde sulfoxylate in 13.50 g of water. The reaction temperature was observed to increase to 74 C over the course of 100 minutes. The reaction was held at the peak temperature for 10 minutes. Next, 1.67 g of t-butylhydroperoxide (5%) was added with a 4.50 g water rinse, 0.07 g of sodium formaldehyde sulfoxylate dissolved in 4.50 g of water was added. The resultant latex was then cooled slowly to <40 C and filtered through a mesh cloth (34.1% solids).

Testing

Emulsions were converted to powder by oven drying at 60° C. emulsions that were first coagulated by freezing. Likewise the emulsions can be dried by any of the methods know to the art such as: spray drying, fluid bed drying, coagulation followed by drying, etc.

Blend Components for Master Batch

TABLE 1

| Material | Company | PHR |
|---|---|---|
| PVC (Formolon F614 (K = 59)) | Formosa Plastics | 100 |
| Stabilizer (Advastab TM-181) | Rohm and Haas | 2.5 |
| Calcium Stearate | Compton | 1.3 |
| Paraffin wax (Amerilube XL165) | American Synthol | 0.8 |
| Oxidized PE wax (*AC-629A) | Honeywell | 0.20 |
| Lubricant (Advalube B3310) | Rohm and Haas | 0.60 |
| Paraloid K175 processing aid | Rohm and Haas | 2 |
| Blowing agent (Ficel ES55 HVC)* | Lanxess Co. | 0.7 |
| Titanium dioxide (Tiona RCL-4) | Millennium Chemicals | 2.5 |
| Calcium carbonate (Omyacarb UFT) | Omya Inc. | 10 |

*Blowing agent is a blend of azodicarbonamide and sodium bicarbonate

The components were blended in a Henschel blender to make a master batch. After the PVC was charged and the blades begin turning, the blender temperature increased from frictional heating at approximately 3-5° C./min. After the PVC was charged, the remaining ingredients were added through the addition port when the temperature reached the temperatures listed below.

Charge PVC to blender at 25° C. and close lid. Turn on mixing blades at about 1000 rpm. Monitor temperature. No cooling. Add Advastab™ TM-181 stabilizer at 52° C. Add Advalube B3310, paraffin wax, XL-165, AC-629A, and calcium stearate at 66° C. Add lubricating processing aid, Paraloid™ K-175 and blowing agent, Ficel ES55 HVC, at 77° C. Add the Titanium dioxide and calcium carbonate at 90° C. At 100° C. start cooling water flow. Reduce blade speed to near minimum (ca. 200 rpm). Cool to 45° C., turn off blades, and remove masterbatch powder from blender.

Example processing aids were post added to the master batch at 11 parts per hundred on PVC (PHR) levels and mixed by shaking in a bag to make example formulations.

The formulated PVC was extruded on a Haake, Polylab twin screw, counter rotating extruder. Zone 1 was set at 160° C. Zone 2 was set at 180° C. Zone 3 was set at 190° C. The die was a coat hanger type die with a 50 mm wide opening and a gap of 1 mm between the lips. The die temperature was set at 160° C. The extruder was run at 45 rpms and the PVC powder was fed into the throat of the extruder by gravity feed. Coming out of the extruder, the foamed PVC was run through a 3 roll stacked cooling setup set at 20° C. The gap between the cooling rolls was 2.79 mm.

Density was measured on the extruded foam strips by cutting 0.75 inch by 1.25 inch pieces of foam from the strips. Density was determined using the method of ASTM D792.

The thickness of the foam strips was determined by measuring the maximum thickness of the strip using a digital caliper. Gloss was measured using a 75 degree micro-gloss meter from Gardner.

Results for the examples are given in table 2 below.

TABLE 2

| PVC Example No. | Blowing Agent Level | Example no. | Fox Tg | Mole % AAEM | Sheet Density (g/cc) | Sheet Thickness (mm) | 75 degree gloss | $M_n/M_w$ (Millions) |
|---|---|---|---|---|---|---|---|---|
| A | 0.7 | 1 | 74.8 | 0 | 0.645 | 2.49 | 70 | 0.80/1.03 |
| B | 0.7 | 2 | 74.1 | 0.48 | 0.608 | 2.59 | | 0.79/1.06 |
| C | 0.7 | 3 | 73.5 | 0.96 | 0.583 | 2.87 | | 0.75/1.04 |
| D | 0.7 | 4 | 71.6 | 2.37 | 0.508 | 3.05 | 58 | 0.77/1.09 |
| E | 0.7 | 5 | 68.74 | 4.63 | 0.502 | 3.33 | | 0.78/1.15 |
| F | 0.7 | 6 | 71.6 | 2.37 | Unstable foam | Unstable foam | | 0.44/0.73 |
| G | 0 | 1 | 74.8 | 0 | 1.410 | — | | 0.80/1.03 |
| H | 0 | 4 | 71.6 | 2.37 | 1.389 | — | | 0.77/1.09 |

$M_n$ = number average molecular weight.
$M_w$ = weight average molecular weight.

As the level of AAEM was increased, foam density decreased and the foam sheet thickness increased. This is an indication that AAEM in the processing aid compositions help stabilize the foam against collapse. For reference, examples G and H show what the density of the PVC was without any blowing agent in the formulation. For these two formulations the master batch was made without the Ficel blowing agent.

Example F shows the advantage of having high MW. The much lower $M_n$ of Example F indicates that it contains more of a low MW tail than the other samples. At the MW of example 6, higher levels of processing aid would be necessary to give stable foam under the listed processing conditions. The foam oscillated as it came out the die giving sections of thick and thin foam. Note also the reduction in gloss seen between the nonfunctional processing aid (example A) and the functional processing aid (example D).

Reprocessability

PVC formulations I through M were made using the master batch, but without the blowing agent. The processing aids were used at 11 PHR. Zone 1 of the extruder was set at 160° C. Zone 2 was set at 180° C. Zone 3 was set at 190° C. A rod die with 0.5 inch inside diameter that was 4.25 inches long with a 3/16 inch diameter aperture was set at 190° C. The extruder rpm was set at 45 and the formulation was fed into the throat of the extruder at 30 g/minute. The examples were extruded to give a strand that was cut into pellets. The pellets where then run through the extruder a second time. Materials that still gave a strand with a smooth outer surface and uniform diameter the second time through were considered reprocessable. Materials with a rough and bumpy surface with a considerable variation in strand diameter were considered to fail in reprocessing due to too much cross linking of the PVC.

Insoluble Gel Content:

Another indication of cross linking to the point that a material is not reprocessable is the amount of insoluble gel in the extruded material. The pellets from examples I through M were placed in THF solvent for 18 hours with shaking to affect solution (0.75 g pellets in 14.25 g of THF). The material in THF was filtered through Whatman #4 filter paper using a Buchner funnel, and the filter paper was dried to remove the residual solvent. The amount of gel in an example was determined with the following calculation: % insoluble material= (Final paper weight−initial paper weight)×100/(0.75 g).

Gel=% insoluble material−% insoluble material of example I (control with no AAEM).

TABLE 3

| PVC Example No. | Polymer Example no. | Mole % AAEM | Reprocessable | % Insoluble Material | % Gel |
|---|---|---|---|---|---|
| I | 1 | 0 | Pass | 4.8 | 0 |
| J | 3 | 0.96 | Pass | 4.7 | 0 |
| K | 4 | 2.37 | Pass | 5.4 | 0.7 |
| L | 5 | 4.63 | Pass | 7.2 | 2.4 |
| M | 7 | 8.81 | Fail | 53.5 | 48.8 |

As can be seen, example M was not re-processable, and because it contains a high level of gel indicating an overly cross linked material that was the likely cause of un-reprocessibility. As indicated above, extruded compositions of this invention have gel content less than about 5% when evaluated according to this technique. Specifically, in utilizing this technique, the control in each instance is one that is identical to the inventive composition except that the control lacks the substituted ethylenically unsaturated monomer in the processing aid copolymer.

The gloss reduction feature of the functional processing aid contain AAEM is shown in Table 4 for unfoamed PVC. The formulation is the same used for the examples in Table 3 in that no blowing agent is used and the same die setup for making foam sheet was used.

TABLE 4

Gloss of PVC Strips with no blowing agent

| PVC Example No. | Polymer Example no. | Mole % AAEM | 75 degree Gloss |
|---|---|---|---|
| I | 1 | 0 | 72 |
| K | 4 | 2.37 | 15 |
| L | 5 | 4.63 | 8.5 |
| M | 7 | 8.81 | 7.4 |

We claim:
1. A formulation comprising:
(a) from 20 to 99% by weight of one or more halogenated polymers (A) selected from homopolymers or copolymers comprising at least 80% by weight of the halogenated polymer of one or more monomers selected from vinyl chloride, vinyl fluoride, vinylidene chloride, and vinylidene fluoride, and chlorinated polyvinyl chloride, and chlorinated polyethylene;
(b) from 0.5 to 20% by weight of one or more (co)polymer (B) based on monoethylenically unsaturated monomers and with a weight average molecular weight greater than 0.5 million, which (co)polymer (B) comprises 0.4 to 100 mole % based on monomer repeat units of one or more functionalities, wherein the functionality is incorporated into said (co)polymer (B) by polymerizing monoethylenically unsaturated monomers containing these functionalities or by post functionalization of said (co)polymer (B) with additional reactions after polymerization;

Wherein each of said (co)polymer (B) is compatible with said halogentated polymer (A), and each of said (co)polymer (B) has a single glass transition temperature (Tg); wherein the monoethylenically unsaturated monomers are selected from the group consisting of acetoacetoxyethyl(meth)acrylate, acetoacetoxypropyl(meth)acrylate, acetoacetoxybutyl(meth)acrylate, 2,3-di(acetoacetoxy) propyl(meth)acrylate, acetoacetoxyetyl(meth)acrylamide, 2-cyanoacetoxyethyl(meth)acrylate, 2-cyanoacetoxyethyl(meth)acrylamide, N-cyanoacetyl-N-methylaminoethyl(meth)acrylate, and N-(2 propionylacetoxybutyl)(meth)acrlamide.

2. The formulation of claim 1 wherein said functionalities comprise 0.8 to 40 mole % based on (co)polymer (B) repeat monomer units.

3. The formulation of claim 1 wherein said functionalities comprise 0.8 to 5 mole % based on (co)polymer (B) repeat monomer units.

4. The formulation of claim 1 wherein the substituted monoethylenically unsaturated monomers are acetoacetoxyethyl(meth)acrylate.

5. The formulation of claim 1 further comprising 0.1 to 6% by weight of a blowing agent.

6. The formulation of claim 1 wherein the Tg of (co)polymer (B) is between 0° C. and 150° C.

7. The composition of claim 1 wherein the Tg of (co)polymer (B) is between 55° C. to 150° C.

8. An extruded formulation comprising (a) from 20 to 99% by weight of one or more halogenated polymers (A) selected from homopolymers or copolymers comprising at least 80% by weight of the halogenated polymer of one or more monomers selected from vinyl chloride, vinyl fluoride, vinylidene chloride, and vinylidene fluoride; and chlorinated polyvinyl chloride, and chlorinated polyethylene;

(b) from 0.5 to 20% by weight of one or more (co)polymer (B) based on monoethylenically unsaturated monomers and with a weight average molecular weight greater than 0.5 million, which polymer comprises 0.4 to 100 mole % based on polymer repeat units of one or more functionalities wherein the functionality is incorporated into said (co)polymer (B) by polymerizing monoethylenically unsaturated monomers containing these functionalities or by post functionalization of said (co)polymer (B) with additional reactions after polymerization;

wherein each of said (co)polymer (B) is compatible with said halogenated polymer (A), and each of said (co)polymer (B) has a single glass transition temperature (Tg); wherein the ethylenically unsaturated monomer is selected from the group of acetoacetoxyethyl(meth)acrylate, acetoacetoxypropyl(meth)acrylate, acetoacetoxybutyl(meth)acrylate, 2,3-di(acetoacetoxy)propyl(meth)acrylate, acetoacetoxyetyl(meth)acrylamide, 2-cyanoacetoxyethyl(meth)acrylate, 2-cyanoacetoxyethyl(meth)acrylamide, N-cyanoacetyl-N-methylaminoethyl(meth)acrylate, and N-(2 propionylacetoxybutyl)(meth)acrlamide.

* * * * *